United States Patent [19]
Edwards

[11] 3,980,485
[45] Sept. 14, 1976

[54] PEAT/CEMENT AND LIKE PRODUCTS AND THEIR METHOD OF PRODUCTION

[75] Inventor: Albert Gray Edwards, Strathaven, Scotland

[73] Assignee: National Research Development Corporation, London, England

[22] Filed: Mar. 28, 1974

[21] Appl. No.: 455,723

[30] Foreign Application Priority Data
Mar. 28, 1973  United Kingdom............... 14912/73

[52] U.S. Cl..................................... 106/93; 106/99; 106/DIG. 1
[51] Int. Cl.² ..................... C04B 7/02; C04B 7/353
[58] Field of Search ............ 106/90, 92, 93, DIG. 1, 106/99; 44/27, 32

[56] References Cited
UNITED STATES PATENTS

| | | | |
|---|---|---|---|
| 63,255 | 3/1967 | Jones | 106/93 |
| 2,057,330 | 10/1936 | Eichert | 106/93 |

*Primary Examiner*—J. Poer
*Attorney, Agent, or Firm*—Cushman, Darby & Cushman

[57] ABSTRACT

A method of forming a peat based product comprises the steps of mixing raw peat with a binder, e.g. Portland Cement, and an amount of internal draining agent for the peat, e.g. hydrated lime, and pressing the resulting mix in a mould to remove at least half the chemically free water content from the mix. The amount of internal draining agent for the peat is preferably not less by weight than about half the amount of binder, and the water content of the raw peat is usually at least 90% by weight and this may be reduced to less than 35% by weight of the mix during pressing. In a variation, a mixture of ground silica sand and hydrated lime initially provides the draining agent, and the pressed article is cured in an autoclave, the silica and hydrated lime combining during autoclaving to provide the binder.

5 Claims, 1 Drawing Figure

U.S. Patent  Sept. 14, 1976  3,980,485
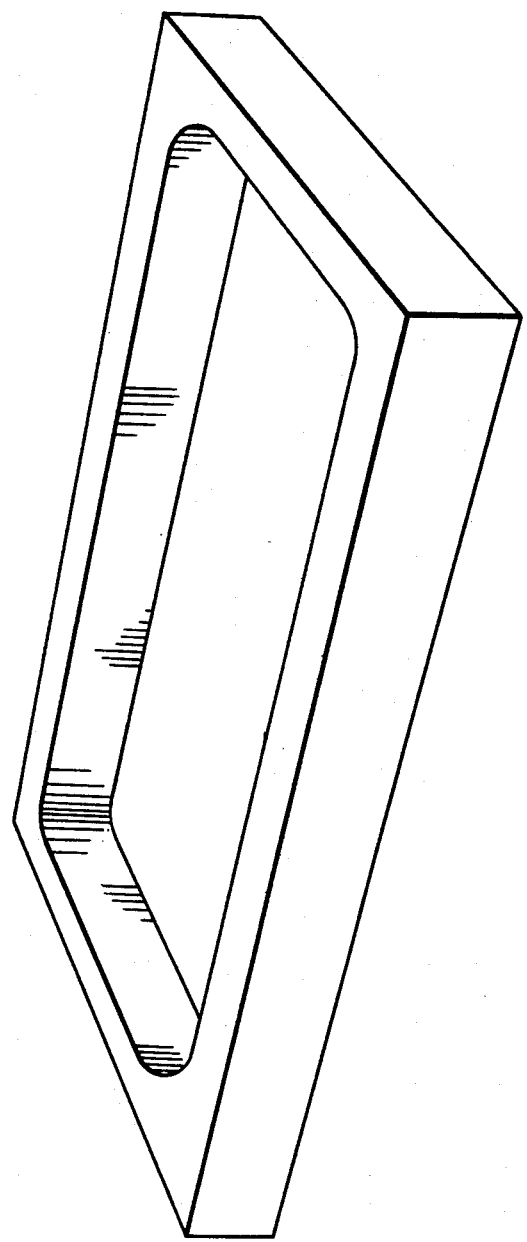

PEAT/CEMENT AND LIKE PRODUCTS AND THEIR METHOD OF PRODUCTION

The invention relates to peat based products and their method of production.

Various proposals have been made before for utilising peat as an aggregate material for cement and casting the cement/peat mix in a mould. None of these prior proposals has proved at all satisfactory, principally because of the high water content of naturally occurring ("raw") peat (typically 90% or more by weight). Firstly the peat had to be predried to some extent by prolonged air drying before it could be used as aggregate and secondly, free water still trapped in the peat/cement product after casting was found to encourage mould growth and staining besides resulting in a rather unpleasant smell.

According to the present invention on the other hand, a method of forming a peat based product comprises the steps of mixing raw peat with a binder and an amount of internal draining agent for the peat, and pressing the resulting mix in a mould to remove at least half the chemically free water content from the mix.

According to a preferred feature of the invention, the water content of the mix is reduced to 35% or less by weight of the mix during pressing. The lesser the final water content the greater is the cohesion of the pressing on demoulding and the greater is the eventual strength of the final article.

Preferably the amount of internal draining agent for the peat is not less by weight than about half the amount of binder. Conveniently the water content of the raw peat is at least 90% by weight.

Portland cement and hydrated lime are suitable materials for the binder and the draining agent respectively.

In particular embodiments of the invention the proportions immediately prior to pressing are 1:½:4.8 (by weight) or 1:1:6 (by volume) of ordinary portland cement: hydrated lime: raw peat.

As an alternative to hydrated lime, the draining agent may be pulverised fuel ash alone or a mixture of hydrated lime and pulverised fuel ash. Coarse grades of pulverised fuel ash are preferred. The term coarse grade in this context specifies a material at least the majority of which (by weight) is retained by a number 52 British Standard sieve.

In one embodiment of the invention, a mixture of ground silica sand and hydrated lime initially provides the draining agent and the method includes the additional step of curing the pressed article in an autoclave, the silica and hydrated lime combining during autoclaving to provide the binder.

If desired the methods of the present invention may be modified by adding additional water to the peat prior to the pressing step, e.g. to make a peat slurry.

The invention also includes a peat based product made by a method according to the present invention.

In one example of the method of the present invention, 62.60 Kg of raw peat (only 4.6 Kg of which are provided by the peat solids), are mixed with 13.05 Kg of ordinary portland cement (as specified in British Standard 12, 1971) and 6.53 Kg. of hydrated lime (as draining agent) in a conventional rotating paddle wheel type concrete mixer e.g. the Liner Cumflow mixer. Alternatively a rotating paddle counterflow mixer could be used. The mix is put into a mould with a perforated base, and a perforated top die is placed in the mould in contact with the mix. The mould is supported on the bottom platen of a press the top platen of which engages the top surface of the die. In operation the press exerts a hydraulic pressure of about $4/MN/m^2$ to the plastic mix and compresses the peat/cement filling until no further water is seen to be expelled from the mould. In the example under consideration this corresponded to a reduction in filling thickness from an initial value of 200mm to a final one of 100mm and a reduction in the free water content from an initial value of 70.5 (by weight) of mix to a final value to 21.8% (by weight) of mix. 4% of the water initially present in the mix combines chemically with the cement during the setting process. The cement/peat filling is maintained under full pressure for some 6 minutes to allow the water ample time to escape. It will be appreciated that the final free water content of 21.8% means that the pressing is immediately cohesive and hence can be readily demoulded and stacked using a vacuum pad lifting device. The pressings are then stacked in air for 28 days to allow the cement matrix to cure and gain strength during which time the free water content will have reached 2.6%. It is desirable from the end of the curing period onwards that peat/cement products made in accordance with the present invention should be kept dry so that the problems of mould growth etc. do not then occur.

Advantages of the method of peat/cement fabrication according to the present invention as compared with previously known techniques are:- (1) raw peat can be used without any need to predry, (2) the removal of excess water in the pressing step enables the water/cement ratio and consequently the strength of binder to be greatly improved and blow holes are eliminated giving uniform cross-sections: (3) the demoulded product has high structural and thermal efficiency, good nail holding properties etc., a good surface finish and can support clean sharp arrises.

Obviously the product can take any one of many shapes depending on the form of the platens. The drawing shows, by way of example only, a dished cement-/peat panel made in accordance with the invention. The outside dimensions of the illustrated panel are 900 × 600 × 100 mm, the volume of the panel is 0.03 $m^3$ and the density of the material is 1050Kg/$m^3$.

The basic compressive strength at this density is 2.8 MN/$m^2$ and the ultimate load bearing capacity of a 2½m storey height assembly of dished panels was 23,300 Kg/m run.

As already mentioned, it is envisaged that additional water could be added to the raw peat if desired prior to pressing. This could be obtained for example from the usual drainage channels in the bog from which the peat is dug and/or from the excess water expelled during pressing. In one such system, for example, water could be mixed with the peat to make a peat slurry which is then pumped from its in situ location to the pressing plant.

I claim:

1. A method of forming a peat based product form raw peat having an initial content by weight of at least 90% chemically free water, comprising the steps of mixing said raw peat with a Portland cement binder, an internal draining agent for the peat selected from the group consisting of pulverized fuel ash, hydrated lime and their mixture present in an amount not less than about half the amount of binder, and pressing the resulting mix into a mold to remove at least half the chemically free water content from the mix.

2. A method as claimed in claim 1 in which the free water content is reduced to 35% or less by weight of the mix during pressing.

3. A method as claimed in claim 1 in which the draining agent is hydrated lime.

4. A method as claimed in claim 1 in which the proportions (by weight) immediately prior to pressing are 1:½:4.8 of ordinary portland cement: hydrated lime: raw peat.

5. A method as claimed in claim 1 in which the draining agent comprises pulverised fuel ash.

* * * * *